(12) United States Patent
Wang (10) Patent No.: US 10,328,984 B2
(45) Date of Patent: Jun. 25, 2019

(54) BIKE ADAPTER

(71) Applicant: Chiu Kuei Wang, Taichung (TW)

(72) Inventor: Chiu Kuei Wang, Taichung (TW)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 70 days.

(21) Appl. No.: 15/607,383

(22) Filed: May 26, 2017

(65) Prior Publication Data
US 2017/0341696 A1 Nov. 30, 2017

(30) Foreign Application Priority Data
May 31, 2016 (TW) .............................. 105116962 A (51) Int. Cl.
| | |
|---|---|
| *B62J 23/00* | (2006.01) |
| *B62J 11/00* | (2006.01) |
| *B62K 3/04* | (2006.01) |
| *B62K 19/18* | (2006.01) |
| *B62J 1/00* | (2006.01) |
| *B62J 99/00* | (2009.01) |

(52) U.S. Cl.
CPC .............. *B62J 23/00* (2013.01); *B62J 11/00* (2013.01); *B62K 3/04* (2013.01); *B62K 19/18* (2013.01); *B62J 1/00* (2013.01); *B62J 99/00* (2013.01)

(58) Field of Classification Search
CPC ....................................................... B62K 3/04
See application file for complete search history.

(56) References Cited

U.S. PATENT DOCUMENTS

| | | | | | |
|---|---|---|---|---|---|
| 5,149,112 | A  * | 9/1992 | Nauman | ................... | B62J 1/167 280/278 |
| 5,639,001 | A  * | 6/1997 | Brady | ...................... | B62J 11/00 224/416 |
| 6,471,232 | B2 * | 10/2002 | Huang | ..................... | B62H 5/00 280/288.4 |
| 6,503,019 | B1 * | 1/2003 | Wang | ...................... | B62J 99/00 224/501 |
| 6,602,015 | B1 * | 8/2003 | Evans | .................... | B60R 9/048 224/924 |
| 9,168,968 | B2 * | 10/2015 | Pomerantz | ................ | B60R 9/10 |

* cited by examiner

*Primary Examiner* — Kevin Hurley
(74) *Attorney, Agent, or Firm* — Che-Yang Chen; Law Offices of Scott Warmuth (57) ABSTRACT

A bike adapter includes a tube composed of an inner tube and an outer tube which is slidably mounted to the inner tube. Two sleeves are respectively mounted to the inner and outer tubes. Each sleeve has an engaging member so as to release the inner/outer tube from the sleeve corresponding thereto. Two catchers are respectively connected to the inner and outer tubes. Each catcher has a catch end which is coated by a coat. A connection portion is formed to the catch end. Two insertions each have a connection end coated by another coat and has a slot. The insertion is securely inserted through the sleeve. The connection portion of the catcher is detachably engaged with the slot in the connection end of the insertion when moving the sleeves along the tube to form an opening between each catcher and each insertion.

2 Claims, 7 Drawing Sheets

BIKE ADAPTER

BACKGROUND OF THE INVENTION

1. Fields of the Invention

The present invention relates to a bike adapter, and more particularly, to a bike adapter that is reliable and easily operated.

2. Descriptions of Related Art

The conventional bike adapter generally comprises two tubes, two sleeves, two catchers and two insertions. The two tubes are mounted to each other and slidable relative to each other to be connected between the seat post and the handlebar stein of a bicycle. The two sleeves are slidably mounted to two free ends of the combination of the two tubes. The sleeves are stopped by the engaging portions of the tubes when the sleeves are slid to a distance. The users can press the engaging portions to release the sleeves from the tubes. The catchers are inserted into the sleeves and fixed to the tubes. The catch end of each of the catchers includes a slot. The insertions are respectively connected to the sleeves such that the insertions are moved with the sleeves. Each insertion has a block so that when the insertions move with the sleeves inward, an opening is defined between the distal end of the insertions and the catch end for accommodating the handlebar stein or the seat post therein. The blocks are able to be engaged with the slots of the catch ends to connect the bike adapter between the handlebar stein and the seat post.

However, the connection between the blocks and the slots as mentioned above is affected by vibration so that the bicycles shakes and the blocks may be loose from the slots.

The catchers are composed of a J-shaped metal plate coated with a rubber or plastic coat by way of injection molding. Nevertheless, during production of the insertions, the catch end of the metal plate may be bent when attaching the rubber or plastic thereto. Therefore, the catchers may not be able to be inserted into the insertions.

U.S. Pat. No. 6,503,019 discloses a retractable top tube for bicycles and the engagement between the catchers and the insertions is not satisfied and needs to be improved.

The present invention intends to provide a bike adapter to eliminate the shortcomings mentioned above.

SUMMARY OF THE INVENTION

The present invention relates to a bike adapter and comprises a tube having an inner tube and an outer tube which is slidably mounted to the inner tube. The inner tube has a first groove defined axially in the outside thereof, and the outer tube having a second groove defined axially in the outside thereof. The second groove forms a ridge protruding in the inside of the outer tube, and the ridge is slidably received in the first groove. An end piece is connected to the first end of the inner tube. The first end of the inner tube is inserted into the first end of the outer tube. Two engaging members are respectively connected to two respective second ends of the inner tube and the outer tube. Each engaging member has a flexible engaging portion. The second end of the inner tube has a first hole defined through the wall thereof, and the second end of the outer tube has a second hole defined through the wall thereof.

Two sleeves each have a passage defined axially therethrough, so that the two sleeves respectively mounted to the two respective second ends of the inner and outer tubes. Each sleeve has an aperture which is located corresponding to the first/second hole of the inner/outer tube. The engaging portion is removably inserted into the first hole and the aperture, and the second hole and the aperture. The inner and outer tubes are slidable in the passages of the sleeves when the engaging portions are pushed to disengage from the apertures.

Two catchers are respectively connected to two respectively second ends of the inner and outer tubes. Each catcher has a catch end formed on one end thereof and the catch end is coated by a first coat. A connection portion is formed on the first end of the catch end and a tongue extends from the second end of the catch end. The tongue extends through the passage of the sleeve corresponding thereto and is connected to outside of the inner/outer tube so that the sleeve is slidable relative to the tongue of the catcher.

Two insertions each have a connection end and a plate on two ends thereof. The connection end has a second coat coated thereto which has a slot. The plate is securely inserted through the passage of the sleeve by fastening members so that the insertions are moved with the sleeves. The connection portion of the catcher is detachably engaged with the slot in the connection end of the insertion.

When one of the insertions is moved toward the end piece, an opening formed between the catcher and the insertion so as to be adapted to accommodate a handlebar stein or a seat post of a bicycle therein. When one of the insertions is moved away from the end piece, the connection portion is engaged with the slot to close the opening.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 6, the bike adapter of the present invention comprises a tube 10 having an inner tube 11 and an outer tube 12 which is slidably mounted to the inner tube 11. Specifically, the inner tube 11 includes a first groove 111 defined axially in the outside thereof, and the outer tube 12 has a second groove 121 defined axially in the outside thereof. The second groove 121 forms a ridge protruding in the inside of the outer tube 12, and the ridge is slidably received in the first groove 111 so that the inner and outer tubes 11, 12 are able to slide relative to each other. An end piece 13 is connected to the first end of the inner tube 11, and the first end of the inner tube 11 is inserted into the first end of the outer tube 12. Two engaging members 14 are respectively connected to two respective second ends of the inner tube 11 and the outer tube 12. Each engaging member 14 has a flexible engaging portion 141. The second end of the inner tube 11 has a first hole 112 defined through the wall thereof, and the second end of the outer tube 12 has a second hole 122 defined through the wall thereof.

Two sleeves 20 each have a passage 22 defined axially therethrough, and the two sleeves 20 are respectively mounted to the two respective second ends of the inner and outer tubes 11, 12. Each sleeve 20 has an aperture 21 which is located corresponding to the first/second hole 112/122 of the inner/outer tube 11/12. The engaging portion 141 removably inserted into the first hole 112 of the inner tube 11 and the aperture 21, and the second hole 122 second tube 12 and the aperture 21. The inner and outer tubes 11, 12 are slidable in the passages 22 of the sleeves 20 when pushing the engaging portion 141 inward to be disengaged from the aperture 21.

Two catchers 30 are respectively connected to two respectively second ends of the inner and outer tubes 11, 12. Each catcher 30 has a catch end 31 formed on one end thereof and the catch end 31 is coated by a first coat 32. A connection portion 311 is formed on the first end of the catch end 31, and a tongue 33 extends from the second end of the catch end 31. The tongue 33 extends through the passage 22 of the sleeve 20 corresponding thereto and is connected to outside of the inner/outer tube 11/12 so that the sleeve 20 is slidable relative to the tongue 33 of the catcher 30.

Two insertions 40 each have a connection end 41 and a plate 43 on two ends thereof. The connection end 41 has a second coat 42 coated thereto which has a slot 411. The plate 43 is securely inserted through the passage 22 of the sleeve 20 by fastening members such as rivets. The connection portion 311 of the catcher 30 is engaged with the slot 411 in the connection end 41 of the insertion 40 so that the insertions 40 are moved with the sleeves 20. The connection portion 311 of each catcher 30 and the slot 411 of each insertion 40 is engaged with each other by way of protrusion-and-recess. Specifically, each of the connection portions 311 includes a curved resilient part/recess, and each of the slots 411 includes a recess/curved resilient part, the curved resilient part is engaged with the recess.

Figure 1:
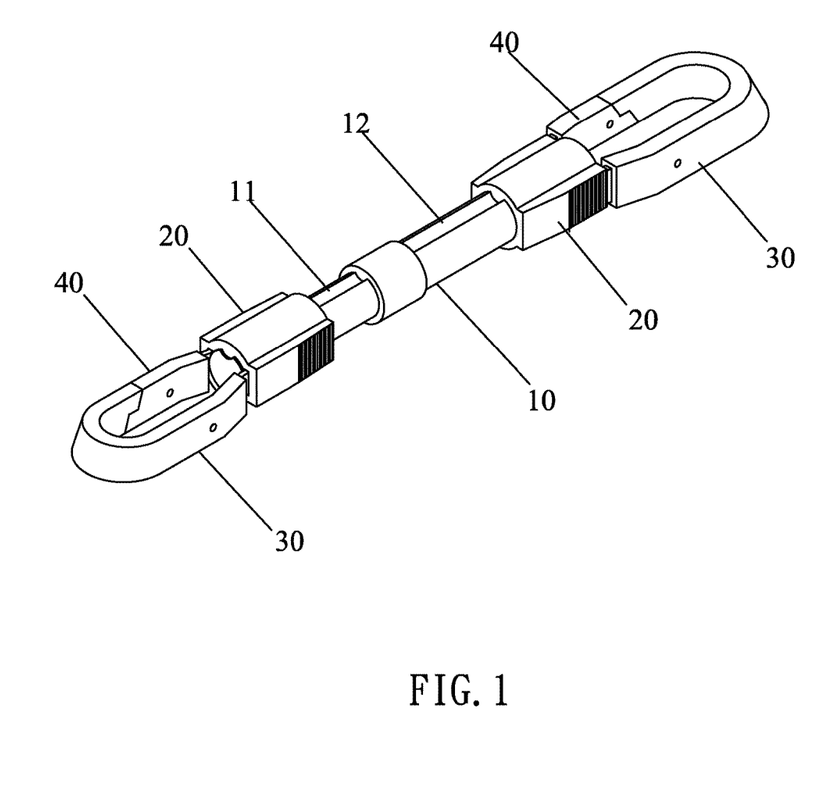
FIG. 1 is a perspective view to show the bike adapter of the present invention.
Figure 2:
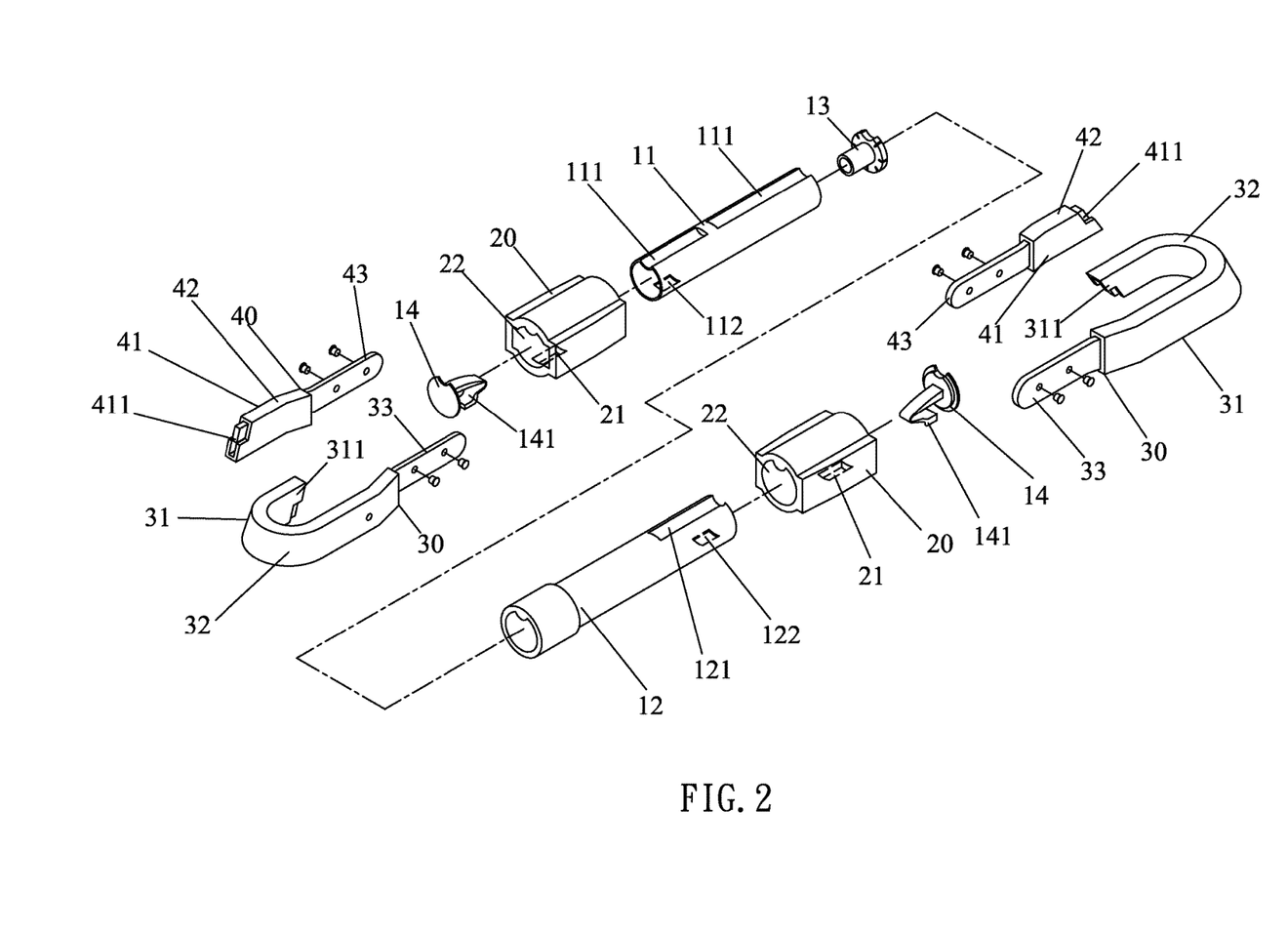
FIG. 2 is an exploded view of the bike adapter of the present invention.
Figure 3:
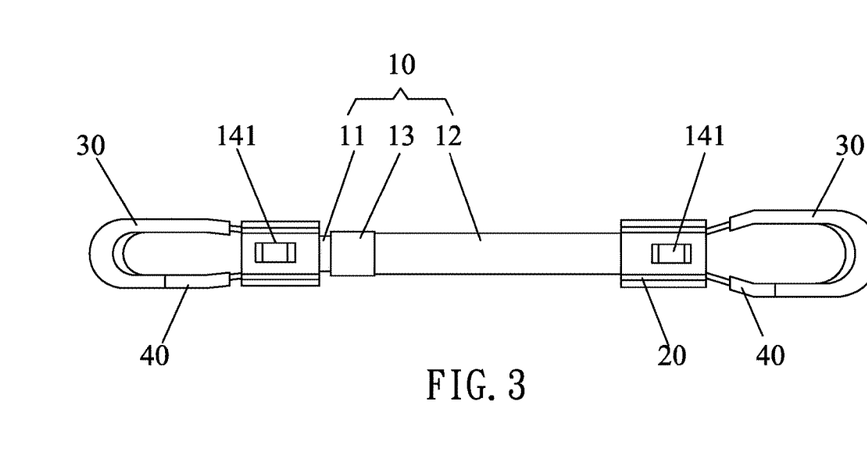
FIG. 3 is a top view of the bike adapter of the present invention.
Figure 4:
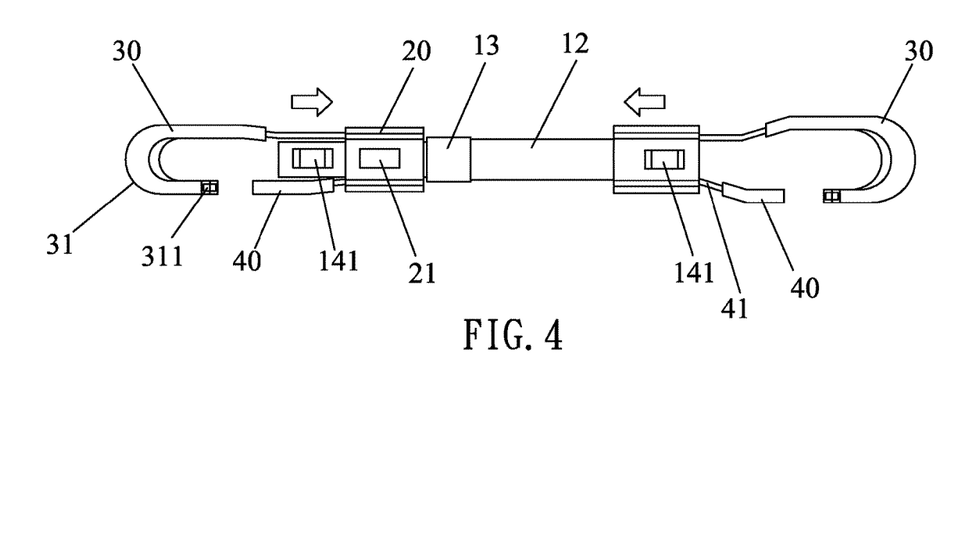
FIG. 4 shows that the sleeves are slid toward each other.
Figure 5:
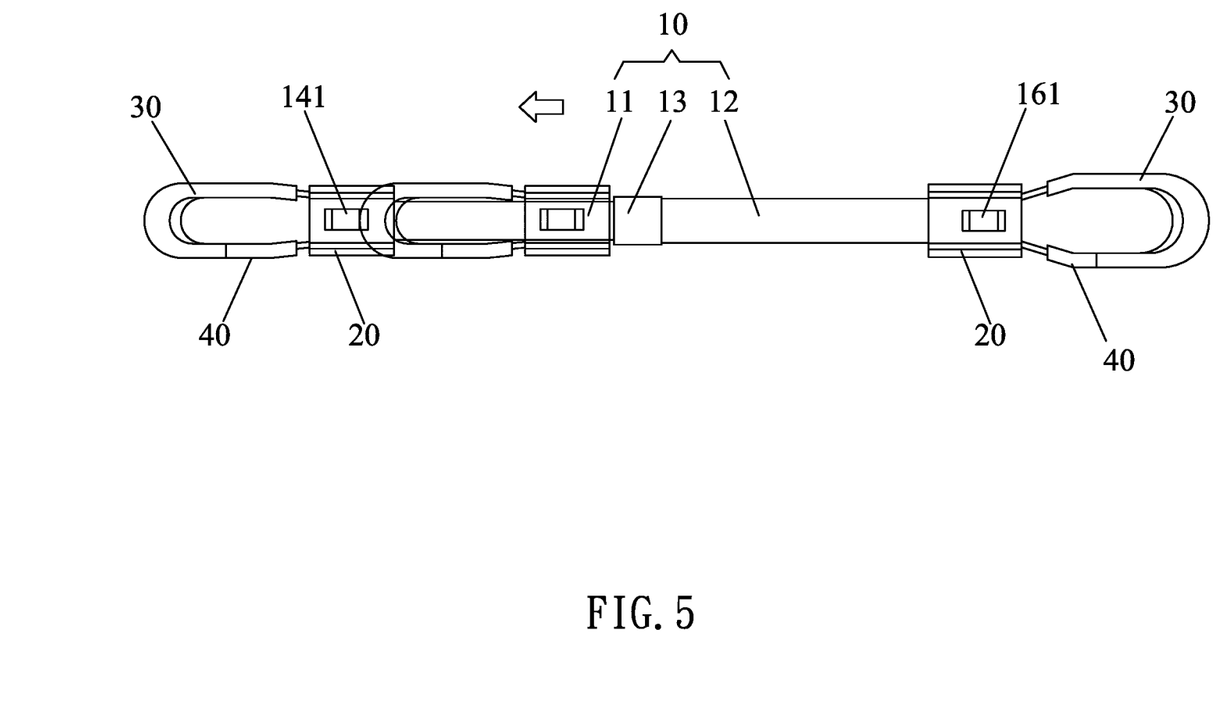
FIG. 5 shows that the sleeves are slid away from each other.
Figure 6:
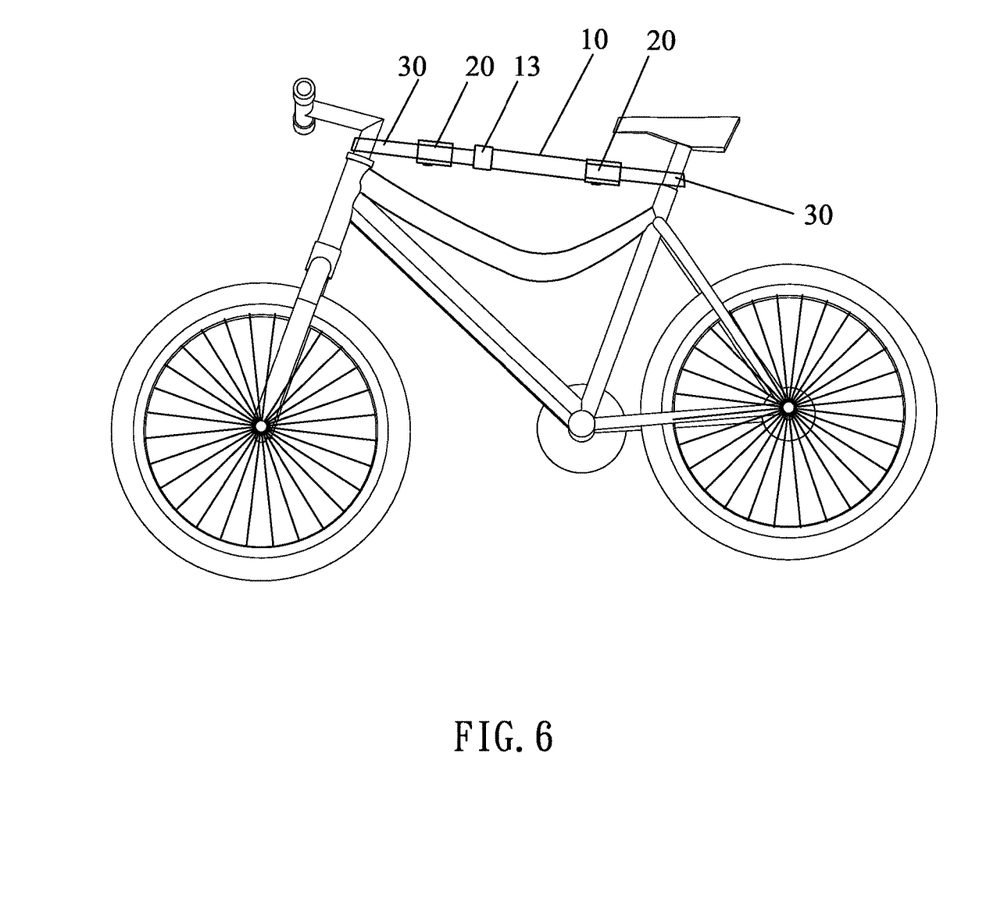
FIG. 6 shows that the bike adapter of the present invention is installed to a bike.

As shown in FIG. 4, when one of the insertions 40 is moved toward the end piece 13, an opening is formed between the catcher 30 and the insertion 40 so as to accommodate the handlebar stein or the seat post of a bicycle therein, as shown in FIG. 6. When the insertion 40 is moved away from the end piece 13, the connection portion 311 is engaged with the slot 411 to close the opening.

Figure 7:
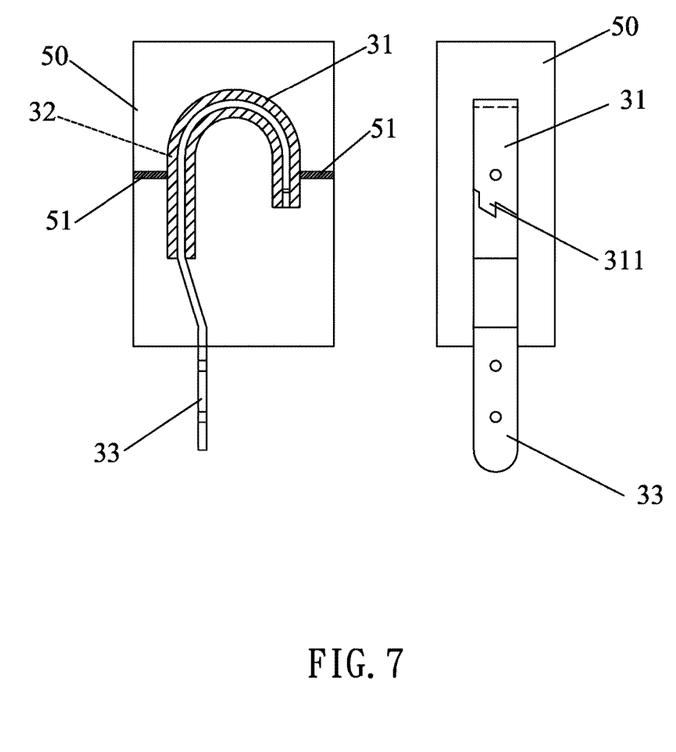
FIG. 7 shows the method for making the catcher of the bike adapter of the present invention.
Figure 8:
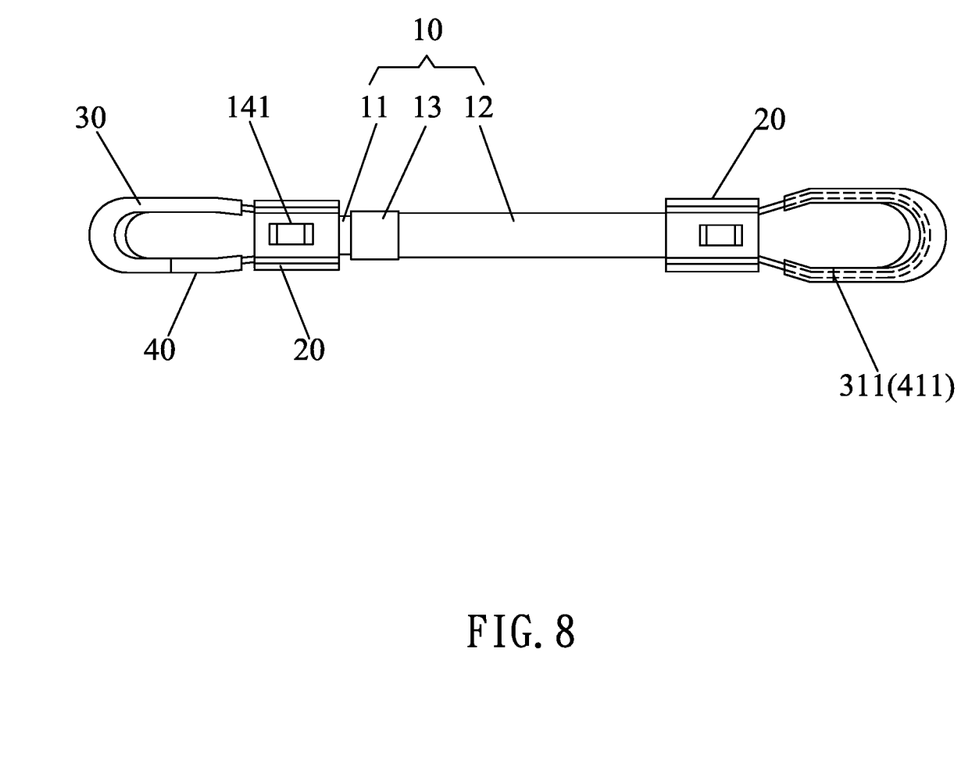
FIG. 8 shows the engagement between the connection portion of the catcher and the slot of the insertion.

As shown in FIGS. 7 and 8, in order to resolve the problem of bending of the metal plate of the conventional catchers of a bike adapter, the present invention provides a method for making the catchers 30. The method includes the following steps:

a first step: putting a J-shaped metal plate into a mold set 50, the mold set 50 having two pins 51 which are located corresponding to two opposite sides of a catch end 31 of a catcher 30, and a second step: injecting plastic material into the mold set 50 to form a coat 32 on an outside of the catcher 30, the coat 32 having a connection portion 311 formed on one of two distal ends of the coat 32, the pins 51 positioning the catch end 31 in the mold set 50.

The present invention also provides a method for making the insertions 40. The method includes the following steps:

a first step: putting an I-shaped metal plate into a mold set 50, the mold set 50 having two pins 51 which are located corresponding to two opposite sides of a connection end 41 of an insertion 40, and a second step: injecting plastic material into the mold set 50 to form a coat 42 on an outside of the insertion 40, the coat 42 having a slot 411 defined in one of two distal ends of the insertion 40, the slot 411 located corresponding to the connection portion 311 of the catcher 30, the pins 51 positioning the connection end 41 in the mold set 50.

The methods ensure that the metal plate of each of the catchers 30 and the insertions 40 to be located at the center of the coats 32, 42. The pins 51 position the catch end 31 and the connection end 41 when the plastic material is injected into the mold set 50. Therefore, the connection between the connection portion 311 and the slot 411 is easy and precise.

While we have shown and described the embodiment in accordance with the present invention, it should be clear to those skilled in the art that further embodiments may be made without departing from the scope of the present invention.

What is claimed is:

1. A bike adapter comprising:
 a tube having an inner tube and an outer tube which is slidably mounted to the inner tube, the inner tube having a first groove defined axially in an outside thereof, the outer tube having a second groove defined axially in an outside thereof, the second groove forming a ridge protruding in an inside of the outer tube, and the ridge being slidably received in the first groove, an end piece connected to a first end of the inner tube, the first end of the inner tube inserted into a first end of the outer tube, two engaging members respectively connected to two respective second ends of the inner tube and the outer tube, each engaging member having a flexible engaging portion, the second end of the inner tube having a first hole defined through a wall thereof, the second end of the outer tube having a second hole defined through a wall thereof;
 two sleeves each having a passage defined axially therethrough, the two sleeves respectively mounted to the two respective second ends of the inner and outer tubes, each sleeve having an aperture which is located corresponding to the first/second hole of the inner/outer tube, the engaging portion removably inserted into the first hole and the aperture, and the second hole and the aperture, the inner and outer tubes being slidable in the passages of the sleeves;
 two catchers respectively connected to two respectively second ends of the inner and outer tubes, each catcher having a catch end formed on one end thereof and the catch end being coated by a first coat, a connection portion formed on a first end of the catch end and a tongue extending from a second end of the catch end, the tongue extending through the passage of the sleeve corresponding thereto and connected to outside of the inner/outer tube so that the sleeve is slidable relative to the tongue of the catcher, each of the connection portions including a curved resilient part/recess, and
 two insertions each having a connection end and a plate on two ends thereof, the connection end having a second coat coated thereto which has a slot, the plate securely inserted through the passage of the sleeve by fastening members so that the insertions are moved with the sleeves, each of the slots including a recess/curved resilient part, the curved resilient part of the connection portion being engaged with the recess of the slot, so that the connection portion of the catcher is detachably engaged with the slot in the connection end of the insertion, when one of the insertions is moved toward the end piece, an opening formed between the catcher and the insertion so as to be adapted to accommodate a handlebar stem or a seat post of a bicycle therein, when one of the insertions is moved away from the end piece, the connection portion is engaged with the slot to close the opening.

2. The bike adapter as claimed in claim 1, wherein the connection portion of each catcher and the slot of each insertion is engaged with each other by way of protrusion-and-recess.

\* \* \* \* \*